(12) United States Patent
Chilcoat et al.

(10) Patent No.: US 6,821,200 B2
(45) Date of Patent: Nov. 23, 2004

(54) LOW-COST/DISPOSABLE HAZARDOUS MATERIAL HANDLING AND ANTI-CONTAMINATION HOODS

(76) Inventors: Edward Alan Chilcoat, 2774 May Ct., Worthington, OH (US) 43235; Robert Talmadge Chilcoat, 665 Donald Dr. North, Bridgewater, NJ (US) 08807

( * ) Notice: Subject to any disclaimer, the term of this patent is extended or adjusted under 35 U.S.C. 154(b) by 0 days.

(21) Appl. No.: 10/400,368

(22) Filed: Mar. 27, 2003

(65) Prior Publication Data

US 2003/0199241 A1 Oct. 23, 2003

Related U.S. Application Data

(60) Provisional application No. 60/367,482, filed on Mar. 27, 2002.

(51) Int. Cl.$^7$ .............................................. B08B 15/02
(52) U.S. Cl. ........................ 454/56; 55/385.2; 454/60
(58) Field of Search ................... 454/56, 60; 55/385.2, 55/318, 319, 320, 467

(56) References Cited

U.S. PATENT DOCUMENTS

| | | | | |
|---|---|---|---|---|
| 2,397,731 A | * | 4/1946 | Fowler | 101/123 |
| 4,202,676 A | * | 5/1980 | Pelosi et al. | 96/416 |
| 4,505,190 A | * | 3/1985 | Fink et al. | 454/56 |
| 4,929,261 A | * | 5/1990 | Jacobson | 96/403 |
| 4,947,510 A | * | 8/1990 | English | 15/310 |
| 5,133,691 A | * | 7/1992 | Karlsson | 454/56 |
| 5,518,450 A | * | 5/1996 | Paveliev | 454/187 |
| 5,807,414 A | * | 9/1998 | Schaefer | 55/385.2 |
| 5,928,075 A | * | 7/1999 | Miya et al. | 454/56 |
| 6,659,857 B2 | * | 12/2003 | Ryan et al. | 454/56 |

FOREIGN PATENT DOCUMENTS

| | | | | |
|---|---|---|---|---|
| GB | 1198920 | * | 7/1970 | 454/60 |
| JP | 55-18134 | * | 5/1980 | 454/60 |

* cited by examiner

Primary Examiner—Harold Joyce

(57) ABSTRACT

Low-cost, potentially disposable, hazardous material handling and anti-contamination hoods are described, that provide a very high level of protection of either personnel, in the case of a hazardous material handling hood, or the process contained in the hood in the case of an anti-contamination hood. Once contaminated these hoods can be hermetically sealed to contain the contamination so that the hood can be moved or shipped for disposal or analysis of the contaminants prior to disposal.

17 Claims, 7 Drawing Sheets

LOW-COST/DISPOSABLE HAZARDOUS MATERIAL HANDLING AND ANTI-CONTAMINATION HOODS

REFERENCE TO RELATED APPLICATIONS

The present application is based upon a Provisional patent Application Ser. No. 60/367,482, filed Mar. 27, 2002 and entitled DISPOSABLE AIRBORNE CONTAMINATE CONTAINMENT WORKSTATION.

BACKGROUND OF THE INVENTION

1.1. Field of the Invention

The present invention relates to the fields of hazardous materials handling and anti-contamination hoods and cupboards.

2. Prior Art

Fume hoods and cupboards have been used for years to protect personnel from hazardous airborne fumes, aerosols, and particulates during procedures where these hazardous materials may be generated or used. Hoods designed to protect personnel from hazardous materials typically pull ambient air into the hood, and exhaust it either to the outside via a duct that carries it to a distant outlet point or, for portable units, back into the same room after the exhaust air has been filtered or otherwise treated to render it free of the hazardous materials. In this type of hood, the pressure within the hood is maintained slightly negative, so that all airflow is into the hood, so that hazardous materials cannot escape and be breathed by or deposited on personnel.

There are other, similar hoods, which are designed to protect the process being undertaken within it from contamination by personnel or by dust and other contaminants in the ambient air. In this latter type of hood, referred to herein as an anti-contamination hood, the airflow is in the opposite direction from the former. Air is filtered or otherwise treated before being passed into the hood, and the pressure within the hood is maintained slightly positive, so that only filtered air can enter the hood.

Typically, most of these hoods are expensive and difficult to clean after use. Furthermore, because of this difficulty of cleaning, simply servicing them can be difficult because they may have been contaminated in normal use. This difficulty of cleaning and servicing has become particularly an issue recently with the potential for chemical and biological terror attacks via the post office and other package delivery services. There is a need for a low-cost hood primarily made of materials that can be burned or incinerated if the hood becomes contaminated.

Disposable hoods have been described. U.S. Pat. No. 5,928,075 describes a design for a disposable hood. However, this design is primarily a semi-closed, limited-access, still-air box, which will fail to adequately protect personnel from airborne contaminants unless an air-drawing means is attached to draw air into the box, and a filter is provided to prevent any contaminants from exiting with the exhaust air from the air-drawing means. While such a fan and filter means is mentioned, the fan and filter described would be completely inadequate to prevent many types of hazardous contaminants from escaping the hood. Furthermore the design requires a front cover that partially occludes the front of the hood, to insure adequate containment of contaminants. It is extremely important in many applications that personnel using the hood be immediately aware that contaminants have been released into the interior of the hood, and an absolute, hermetic sealing means must be provided to insure that no contaminants can escape if the unit must be shipped or otherwise handled after contamination. U.S. Pat. No. 5,928,075 fails to address these issues. The present invention addresses all of these concerns and results in a hood applicable to a much larger number of applications than the hood taught in U.S. Pat. No. 5,928,07.

Of particular concern in disposable hoods used for protection of extremely high hazard contaminates is the efficiency of the filtering means protecting personnel, or preventing contamination of processes by microbes and other extremely small contaminants. U.S. Pat. No. 6,328,788 describes a unique filtering material that has significant advantages for these applications. A composite material comprised of a combination of dissimilar fibers, principally, polypropylene and polymethaphenylene isophatalamide fibers is described that results in a phenomenon called triboelecticity when air passes through the material. Triboelecticity is a static electric charge that forms on the fibers, which greatly increases the efficiency of filtration, with reduced occlusion of the airflow.

The purpose of the present invention is to simplify or eliminate issues of cleaning, servicing and disposal of either hazardous material handling, or anti-contamination types of hood, while providing a high level of safety.

BRIEF SUMMARY OF THE INVENTION

Hazardous materials handling and anti-contamination flow hoods are disclosed. These hoods are specifically designed for low cost production, so that, in the case of hazardous materials handling hoods, the entire unit, or substantial portions, can economically be disposed of if contaminated, or if either type of unit must be serviced. The invention further includes low-cost, high efficiency filters to further facilitate low cost. Means may be provided for some applications to assist personnel in quickly identifying the presence of hazardous contaminants, so that the unit can be immediately sealed.

Furthermore, the design provides built-in means for closing and/or sealing the unit so that no contamination can escape during and after the sealing process. Once sealed, the unit can be burned in an incinerator, or shipped economically to an analytical laboratory to determine the nature of the contamination if unknown, and burned afterwards.

DETAILED DESCRIPTION OF THE INVENTION

Figure 1:
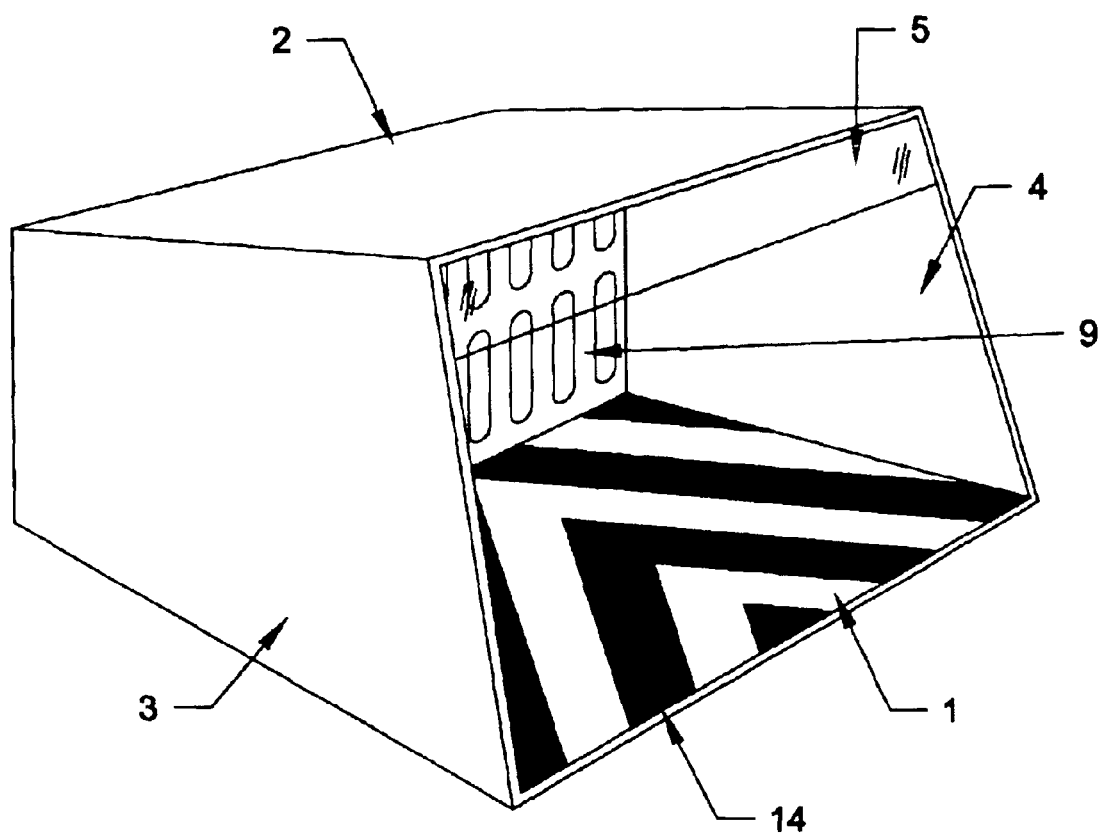
FIG. 1 is an illustration of one form of a hazardous materials flow hood in accordance with the present invention.

First referring to FIG. 1, an illustration of one embodiment of the present invention may be seen. In this embodiment, a hazardous material handling hood, the primary structure of the hood is formed by cutting most of the components from a low-cost corrugated plastic material and then folding and fastening these together with adhesives, staples, by interlocking tabs and slots cut into the components, by welding, or by other suitable means, in a manner similar to a corrugated cardboard box. While corrugated plastic has been chosen in this preferred embodiment, any suitable low-cost sheet material can be used for construction or, alternatively, the primary structure of the hood can be molded from a low cost plastic using any of several standard molding processes.

Again referring to FIG. 1, the structure consists of a bottom surface 1, a top surface 2, and left and right side surfaces 3 and 4. These surfaces connect sealingly to each other along matching side edges. A sealing foam or adhesive can be applied at all connecting edges to improve the seal at these points. The front edges of the said four surfaces form an opening allowing access to the interior volume of the hood, which can be the full opening defined by the four said edges, or a smaller opening in an optional additional front surface 5 that partially closes the opening, with its outside edges sealingly attached to some or all of the front edges of the said four surfaces 1, 2, 3, and 4.

Figure 2:
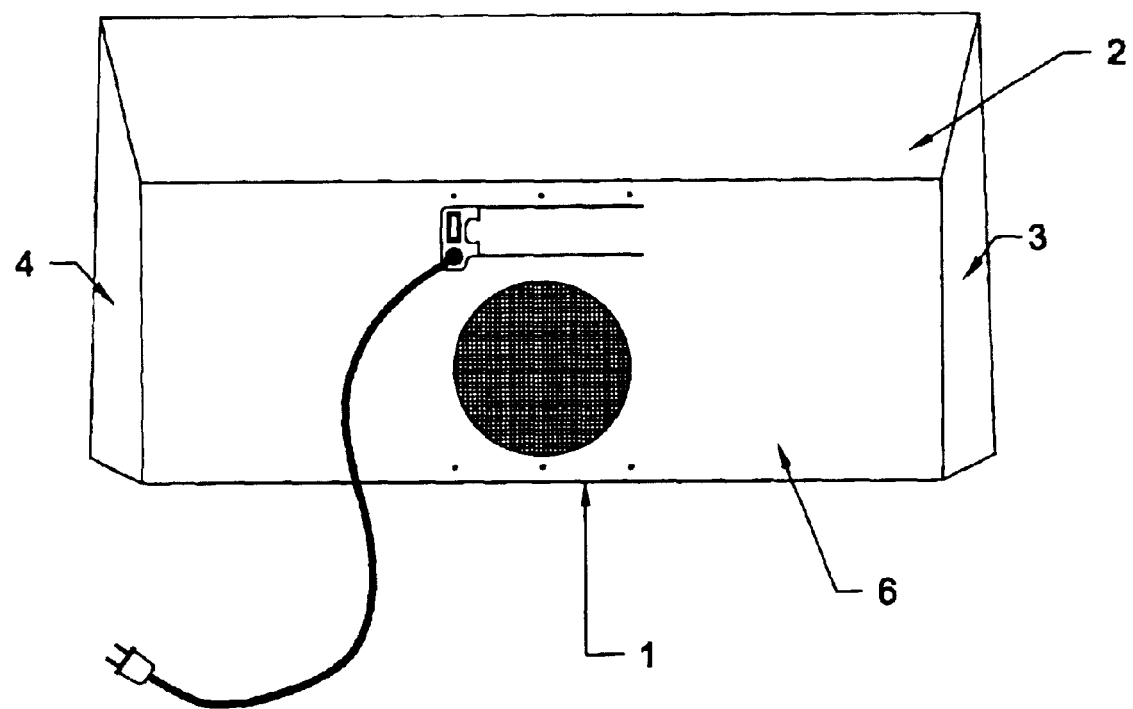
FIG. 2 is a rear view of a hazardous materials flow hood in accordance with a preferred embodiment of the present invention for protecting personnel from contaminants.

Referring to FIG. 2, the rear of the structure is closed by at least one additional surface 6, its edges sealingly connected to the rear edges of said four surfaces 1, 2, 3 and 4. The said six surfaces, 1, 2, 3, 4, 5, and 6, or five surfaces if surface 5 is not included, form a box-like structure with a front opening providing access. It should be noted that the edges referred to herein may be defined by bends or folds in the sheet materials from which the surfaces are formed, and more than one surface may be formed simply by bending or folding a flat sheet of material.

Figure 3:
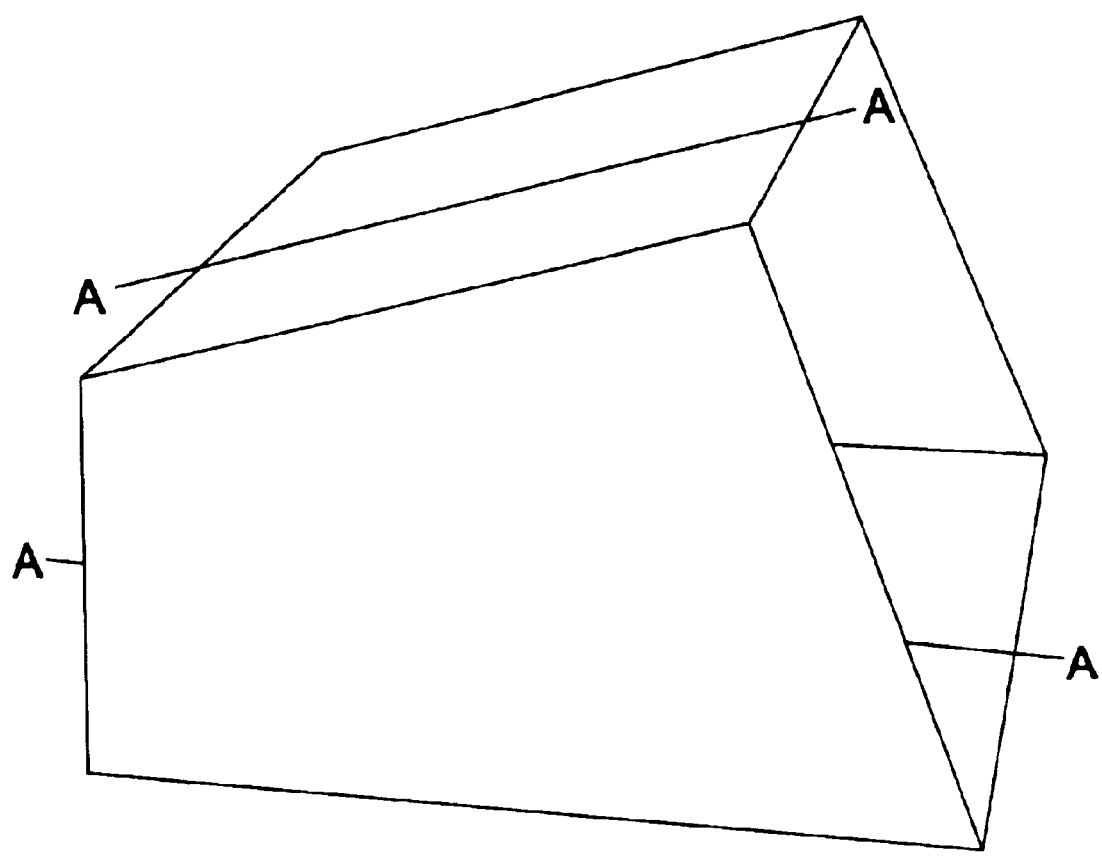
FIG. 3 is a side view of a hazardous materials flow hood in accordance with a preferred embodiment of the present invention for protecting personnel from contaminants.
Figure 4:
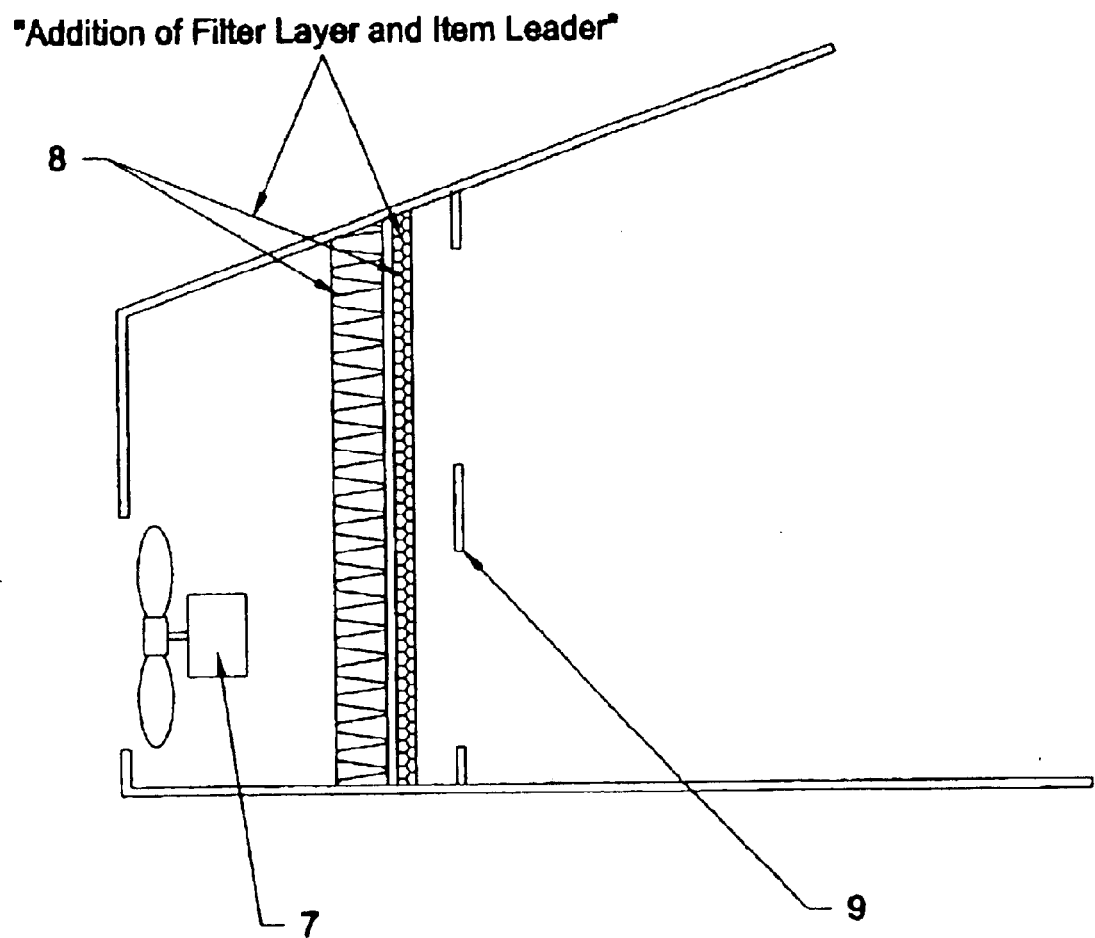
FIG. 4 is a cross section view taken through line A—A of FIG. 3.

Referring to FIG. 3 and 4, a means 7 is provided for drawing ambient air into and through the box, in this preferred embodiment, a small electric fan. Alternatively, this air drawing means could be remote, connected to the hood by means of a suitable duct or pipe. This air-drawing means would preferably be sealingly attached to an appropriately sized opening in one or more of the surfaces, either directly or via a suitable duct.

Referring to FIG. 4, also provided is a filtering means 8 through which all air passing through the box must pass. Said filtering means might be a pleated or non-pleated woven filter material, a pleated or non-pleated non-woven filter material, granulated filter material, polymeric filter material, or any other suitable filtering material. There may be a particular advantage in using a triboelectric filtering material comprised of polypropylene and polymethaphenylene isophatalamide fibers, which develop an electrostatic charge when air flows through the material, greatly improving the filtering efficiency. Said filter means may consist of a single filter stage, or several stages of filtering using several different materials in series. This material is interposed between the interior of the box and the air-drawing means in such a way that no air drawn into the interior of the box can bypass the filter.

Also referring to FIGS. 1 and 4, there may also be an additional perforated or louvered surface 9 to form a baffle to distribute air flow within the interior of the box to optimize performance. This may or may not be sealingly attached to some or all of the inside surfaces of the box, and may also provide support and protection for the filter means 8.

Figure 5:
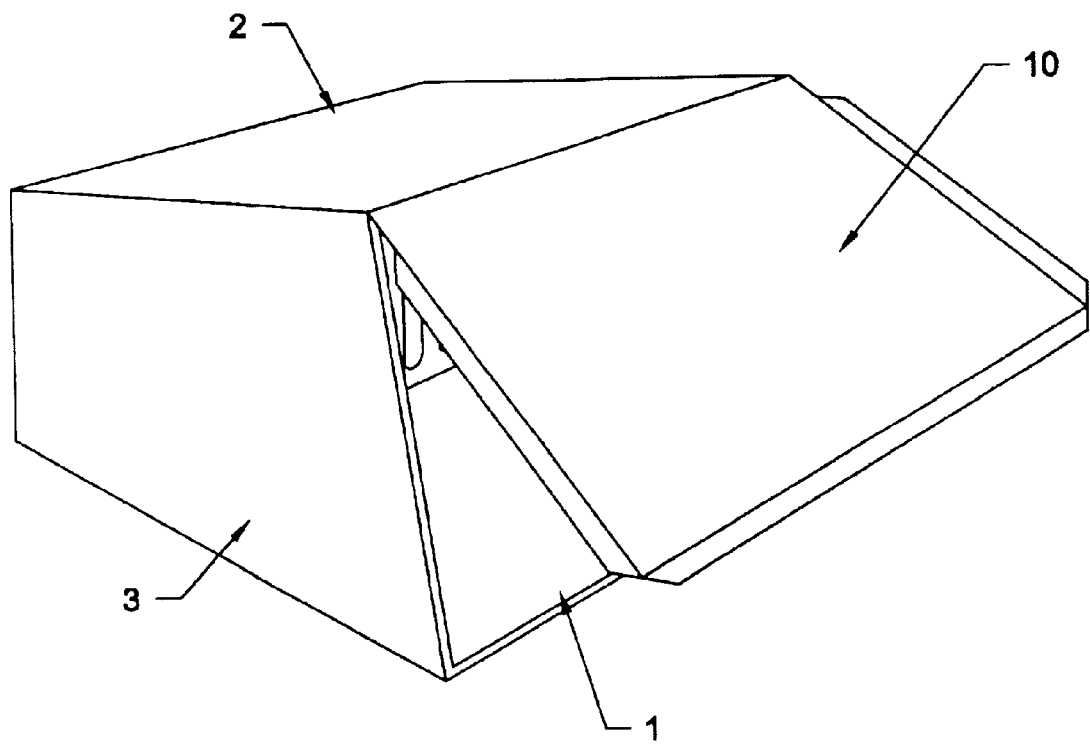
FIG. 5 is a view similar to FIG. 1 with the sealing lid being lowered to occlude the front access.

Referring to FIG. 5, an additional surface 10 is provided to occlude the front opening of the box. This may be attached along one of its edges to the corresponding edge of surface 1, 2, 3 or 4, or may be completely separate. This forms a lid that closes the box, trapping any contaminants inside.

Figure 6:
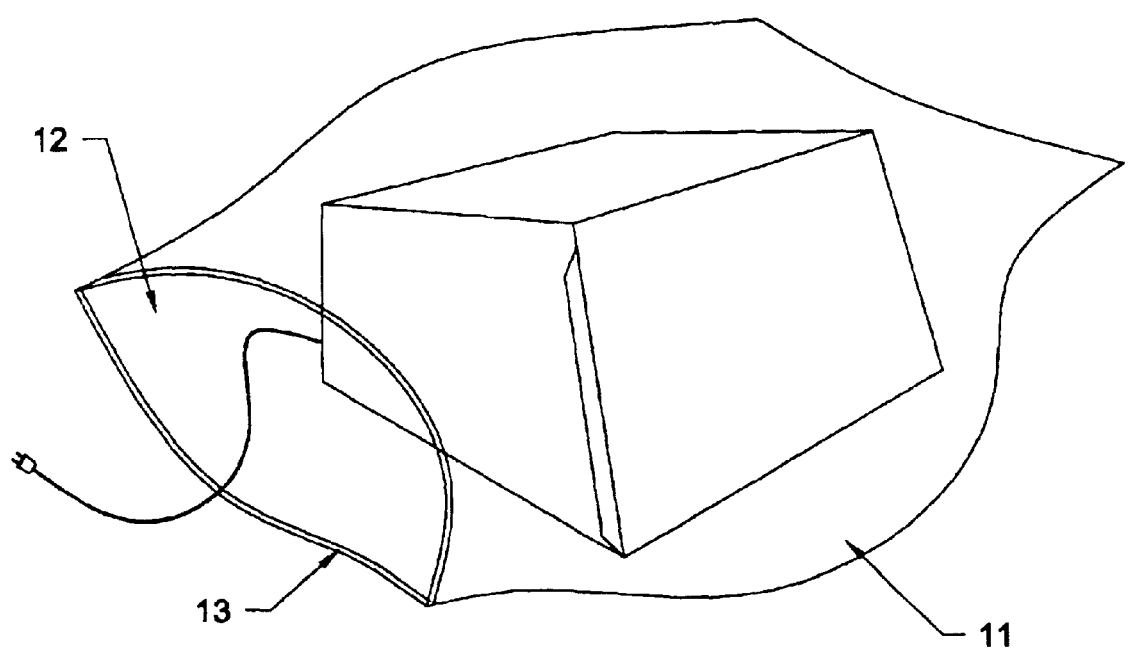
FIG. 6 is a view showing the embodiment of FIGS. 1–5 illustrating the front of the invention sealed by its lid, and being sealed in a plastic bag for disposal or later analysis.

Typically in the preferred embodiment, the lid will be closed while the air drawing means is still operating. This is a key feature because it prevents any contaminants from escaping during the closing procedure. However, the lid may not provide a hermetic seal by itself, particularly once the air drawing means is disconnected. For this reason, referring to FIG. 6, a final, hermetic sealing means 11 is provided. This is a bag or envelope of flexible plastic or other contaminant-impervious material, with an opening 12 that is sufficient to pass the entire closed hood into the interior of the bag, which can be hermetically sealed by means of 13, a simple tie wrap, "zip" type sealing closure, an adhesive closure, or any other suitable air-tight closure at the opening 12. In use, the last phase of sealing by the user would be to insert the closed hood into bag 11 with the air drawing means 7 still attached and operating. The very last step is to disconnect the power source to the air drawing means, pass the connecting cord through opening 12, and hermetically seal the entire hood assembly in the bag by closing the opening with sealing means 13.

Referring again to FIG. 1, it is advantageous in some applications for the operator to be able to identify quickly that particles have been released into the interior of the hood. This could be any of several types of electronic particle detector, chemically based detection system, UV light detection system, or could be as simple as a pattern of alternating dark and light colored panels 14 that provide visual contrast making it easier to detect visually the presence of particles.

Again referring to FIG. 4, a anti-contamination hood can be constructed using a very similar design by reversing the flow of the air-drawing means 7. In this embodiment, the air is first filtered by filtering means 8 and then passes through the interior of the hood toward the front. In this case baffle 9 could preferably be formed as a "egg crate" structure, to lower the Reynolds number of the flowing air to promote laminar flow through the interior of the hood. This airflow prevents contaminants from entering the hood from the front access opening.

Figure 7A:
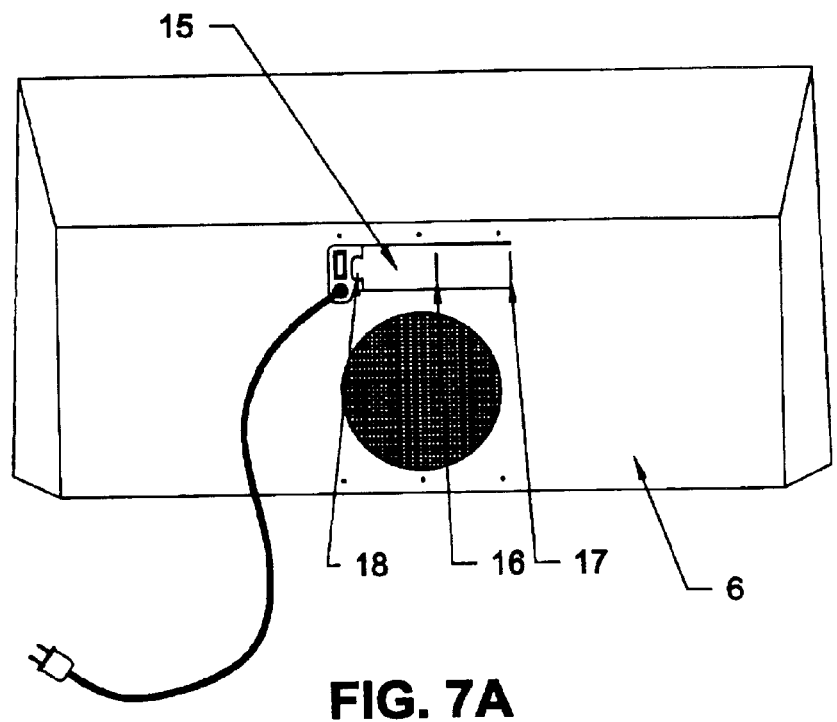
FIG. 7 is a close-up view of the rear of the preferred embodiment illustrating a built-in standoff that prevents the hood from being pushed against a wall, occluding air flow through the rear of the unit.
Figure 7B:
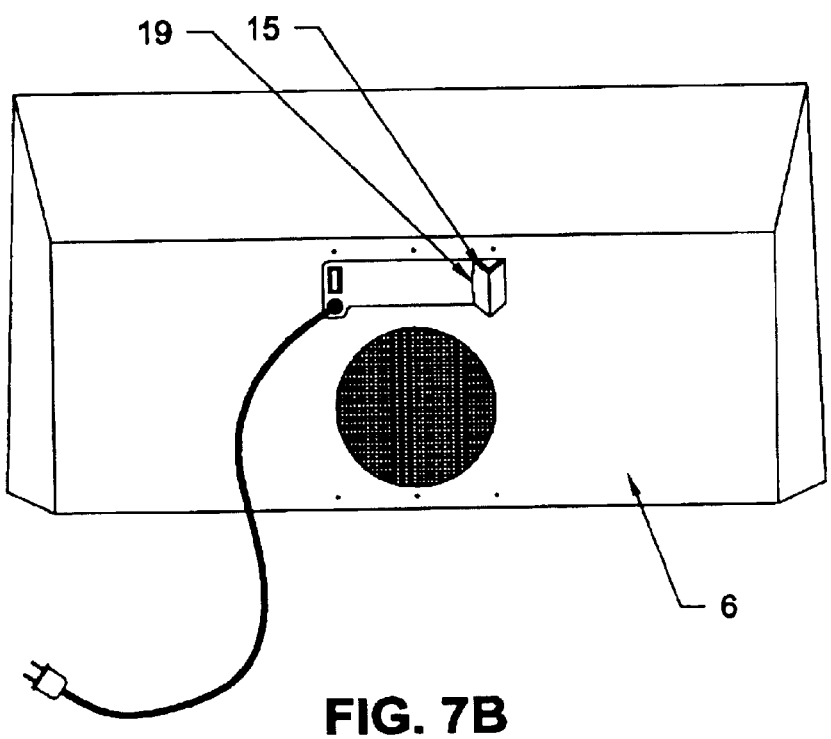

Referring to FIGS. 7A and 7B, a built in standoff 15 is preferably provided on the rear surface of the preferred embodiment, preventing the hood from being pushed so close to a wall or any other surface behind the hood that the discharge of the air drawing means is occluded. Said standoff is preferably formed flat by partially punching out an appropriate shape from the material of the rear surface as illustrated in FIG. 7A, and is erected by bending at points 16 and 17, and inserting tab 18 into slot 19 punched into the material of the air-drawing means as illustrated in FIG. 7B.

It should be obvious to one skilled in the art that a number of alternative construction methods and materials could be used. For example, many of the surfaces of the basic structure could be formed from a single sheet of suitable material, the structure formed when these surfaces are bent and assembled in the manner of corrugated cardboard boxes. Furthermore, in order to improve the stiffness of the structure, the surfaces may be formed using more than one thickness of sheet material laminated or simply folded together. If using corrugated materials, folding the surfaces to form double thicknesses can further improve performance by preventing undesired air passage axially along the corrugations. Alternatively, portions or all of the structure could be molded from plastic materials by injection molding, blow molding, or other molding processes.

We claim:

1. A hazardous materials handling flow hood comprised of the following:
   a. a housing fabricated of plastic, paper, composite or sheet metal material, said housing having a open front,
   b. a means of drawing air into the housing through the open front of the housing,
   c. a filter means to trap any particulates, fumes or aerosols, preventing contaminate materials drawn into the housing from being discharged out of the housing,
   d. a lid or other closure means to occlude the open front of the hood with or without the air-drawing means still operating,
   e. an airtight envelope or bagging means to completely contain the hood and its air drawing means as the final step in securing a contaminated hood.

2. A hazardous materials handling flow hood of claim 1 wherein the air drawing means is an electric motor and fan.

3. A hazardous materials handling flow hood of claim 1 wherein the filtering means is a woven or non-woven filtering material.

4. A hazardous materials handling flow hood of claim 1 wherein the filtering means is a non-woven composite triboelectric filtering material made of polypropylene and polymethaphenylene isophatalamide fibers.

5. A hazardous materials handling flow hood of claim 1 wherein the filtering means is composite filter of at least two layers of filtering material in series.

6. A hazardous materials handling flow hood of claim 1 wherein the envelope or bagging means is a plastic bag.

7. A hazardous materials handling flow hood of claim 1 wherein the envelope or bagging means is a plastic bag or envelope with an adhesive closure.

8. A hazardous materials handling flow hood of claim 1 wherein the envelope or bagging means is a plastic bag or envelope with an interlocking "zip" type closure.

9. A hazardous materials handling flow hood of claim 1 wherein he particulate-detecting means is a pattern of black and white or other contrasting colored regions applied to the bottom inside surface of the hood.

10. A hazardous materials handling flow hood of claim 1 that also incorporates a built-in standoff to prevent the hood from being placed too close to a wall or other surface that can occlude the air flow.

11. An anti-contamination flow hood having a rear and having a open front, comprised of the following:
    a. a housing fabricated of plastic, paper or composite sheet metal material,
    b. a means of drawing air into the housing from the rear of the hood so that there is a continuous flow of air out the open front of the hood,
    c. a means of ensuring that the airflow from the rear to the front of the hood is approximately uniform over the interior and open area of the front of the hood,
    d. a filter means to trap any contaminates in the air being drawn into the hood by the air-drawing means.
    e. an airtight envelope or bagging means to completely contain the hood and its air drawing means as the final step in securing a contaminated hood.

12. An anti-contamination flow hood of claim 11 wherein the air drawing means is an electric motor and fan.

13. An anti-contamination flow hood of claim 1 wherein the filtering means is a non-woven filtering material.

14. An anti-contamination flow hood of claim 11 wherein the filtering means is a non-woven composite triboelectric filtering material made of polypropylene and polymethaphenylene isophatalamide fibers.

15. A anti-contamination flow hood of claim 11 wherein the filtering means is composite filter of at least two layers of filtering material in series.

16. An anti-contamination flow hood of claim 11 wherein the envelope or bagging means is a plastic bag or envelope with an adhesive closure.

17. An anti-contamination flow hood of claim 11 that also incorporates a built-in standoff to prevent the hood from being placed too close to a wall or other surface that can occlude the air flow.

* * * * *